US005528932A

United States Patent [19]

Bauer et al.

[11] Patent Number: 5,528,932

[45] Date of Patent: Jun. 25, 1996

[54] METHOD FOR RECOGNIZING LAMBDA PROBES CONNECTED IN A SIDE-INVERTED MANNER

[75] Inventors: Alois Bauer, Donauwörth; Dietmar Hundertmark, München; Günter Ranzinger, Garching, all of Germany

[73] Assignee: Bayerische Motoren Werke AG, Munich, Germany

[21] Appl. No.: 495,258

[22] Filed: Jun. 27, 1995

[30] Foreign Application Priority Data

Jul. 4, 1994 [DE] Germany .......................... 44 23 344.2

[51] Int. Cl.$^6$ .......................... F02D 41/22; B60K 26/00

[52] U.S. Cl. ...................... 73/118.1; 73/23.31; 73/865.9

[58] Field of Search .............................. 73/23.31, 118.1, 73/865.8, 865.9, 16, 118.2, 116

[56] References Cited

U.S. PATENT DOCUMENTS

| | | | |
|---|---|---|---|
| 4,121,548 | 10/1978 | Hattori et al. | 123/32 EE |
| 4,134,261 | 1/1979 | Iizuka et al. | 60/276 |
| 4,322,968 | 4/1982 | Takami et al. | 73/23.31 |
| 4,780,826 | 10/1988 | Nakano et al. | 73/117.3 |
| 4,782,690 | 11/1988 | Terasaka | 73/116 |
| 4,926,634 | 5/1990 | Pütz et al. | 60/274 |
| 4,928,518 | 5/1990 | Tamura | 73/23.31 |
| 4,943,238 | 7/1990 | Gregorio | 73/117.3 |
| 4,961,341 | 10/1990 | Tanaka et al. | 73/118.1 |
| 4,980,834 | 12/1990 | Ikeda et al. | 364/431.05 |
| 5,182,907 | 2/1993 | Kuroda et al. | 60/276 |
| 5,228,335 | 7/1993 | Clemmens et al. | 73/118.1 |
| 5,268,643 | 12/1993 | Aso et al. | 73/865.9 |
| 5,298,865 | 3/1994 | Denz et al. | 324/509 |
| 5,423,203 | 6/1995 | Namiki et al. | 73/118.1 |

FOREIGN PATENT DOCUMENTS

| | | |
|---|---|---|
| 2450354 | 9/1980 | France . |
| 4120426 | 1/1992 | Germany . |
| 4334557 | 4/1995 | Germany . |
| 1315627 | 6/1987 | U.S.S.R. . |
| 90/04090 | 4/1990 | WIPO . |

OTHER PUBLICATIONS

Communication from European Patent Office dated Dec. 1, 1995.

*Primary Examiner*—Richard Chilcot
*Assistant Examiner*—George M. Dombroske
*Attorney, Agent, or Firm*—Evenson, McKeown, Edwards & Lenahan

[57] ABSTRACT

The invention provides a method for detecting the improper interchanged installation of left and right lambda probes in an internal-combustion engine having two cylinder banks, each of which has an exhaust gas catalyst with a lambda probe and a lambda control unit assigned thereto, and whose injection valves can be switched off at least by cylinder bank. The injection valves of one of the two cylinder banks are switched off at least for a time which corresponds to the reaction time or change-over time of the lambda probes. The signal from the lambda probe assigned to the switched-off cylinder bank is then compared with a predetermined threshold value at the end of the switch-off time of the injection valves. An incorrect connection of the lambda probes is detected when the lambda probe signal exceeds or falls below the threshold value.

4 Claims, 2 Drawing Sheets

METHOD FOR RECOGNIZING LAMBDA PROBES CONNECTED IN A SIDE-INVERTED MANNER

BACKGROUND AND SUMMARY OF THE INVENTION

This invention relates to a method for detecting an incorrect installation of lambda probes in an internal-combustion engine with two cylinder banks, each having its own exhaust gas catalyst which has a lambda probe with a lambda control unit connected thereto, and whose injection valves can be switched off at least by cylinder bank.

German Patent Application P 43 34 557.3, which has not yet been published, discloses an arrangement for idling control of a motor vehicle internal-combustion engine with two cylinder banks to which one exhaust gas catalyst respectively is assigned which comprises a lambda probe. In this known device, the injection valves of one of the two cylinder banks are alternately switched off during the idling operation of the internal-combustion engine. The switching off of the injection valves of an internal-combustion engine by cylinder banks is therefore known from the above-mentioned document.

In internal-combustion engine controls with two separate lambda control circuits, there is the risk that the lambda probes of the exhaust gas catalysts, which are interchangeable, and are provided separately for the two cylinder banks, may be installed improperly with the left hand probe being connected on the right and vice, versa. (That is, two are reversed or interchanged.) This has the effect that one cylinder bank of the internal-combustion engine becomes too lean and the other becomes too rich, up to the maximal control limit of the lambda control. As a result, the internal-combustion engine runs erratically, significantly reducing comfort.

So that the lambda probes can no longer be improperly interchanged in this manner, they could be mechanically coded, for example by different plug-type connections or by different cable lengths for the left and for the right lambda probe. However, this approach would violate the principle of identical parts for the lambda probes, which would increase their costs.

It is therefore an object of the invention to provide a simple and cost-effective method for recognizing lambda probes which are improperly connected, or interchanged, in this manner, in the case of an internal-combustion engine with two cylinder banks to which separate exhaust gas catalysts are assigned which have a lambda probe and a lambda control unit connected thereto.

This object is achieved according to the invention, in that the injection valves of one of the two cylinder banks are switched off for a time which corresponds at least to the reaction or change-over time of the lambda probes. The lambda probe signal of the lambda probe assigned to the switched-off cylinder bank is then compared (at the end of the switch-off time of the injection valves) with a predetermined threshold value, and an interchanged connection of the lambda probes is determined to exist when the lambda probe signal exceeds or falls below the threshold value. The threshold value will be exceeded when the lambda probe emits a small signal in the case of a lean mixture and a large signal in the case of a rich mixture. Analogously, the signal will fall below the threshold value when the lambda probe emits a large signal in the case of a lean mixture and a small signal in the case of a rich mixture.

In an advantageous embodiment of the method according to the invention, the lambda controls are blocked and an error indication device is activated when an interchanged connection of the lambda probes is recognized.

In a further embodiment of the method according to the invention, an external testing device which can be connected to a diagnostic connection of the internal-combustion engine is used to recognize an interchanged connection of the lambda probes.

Advantageously, the method according to the invention can also be included in the internal-combustion engine control devices as a so-called on-board diagnostic function. As a result, an improper exchange of the lambda probes would be recognized immediately also between visits to the repair shop.

Other objects, advantages and novel features of the present invention will become apparent from the following detailed description of the invention when considered in conjunction with the accompanying drawings.

DETAILED DESCRIPTION OF THE DRAWINGS

Figure 1:
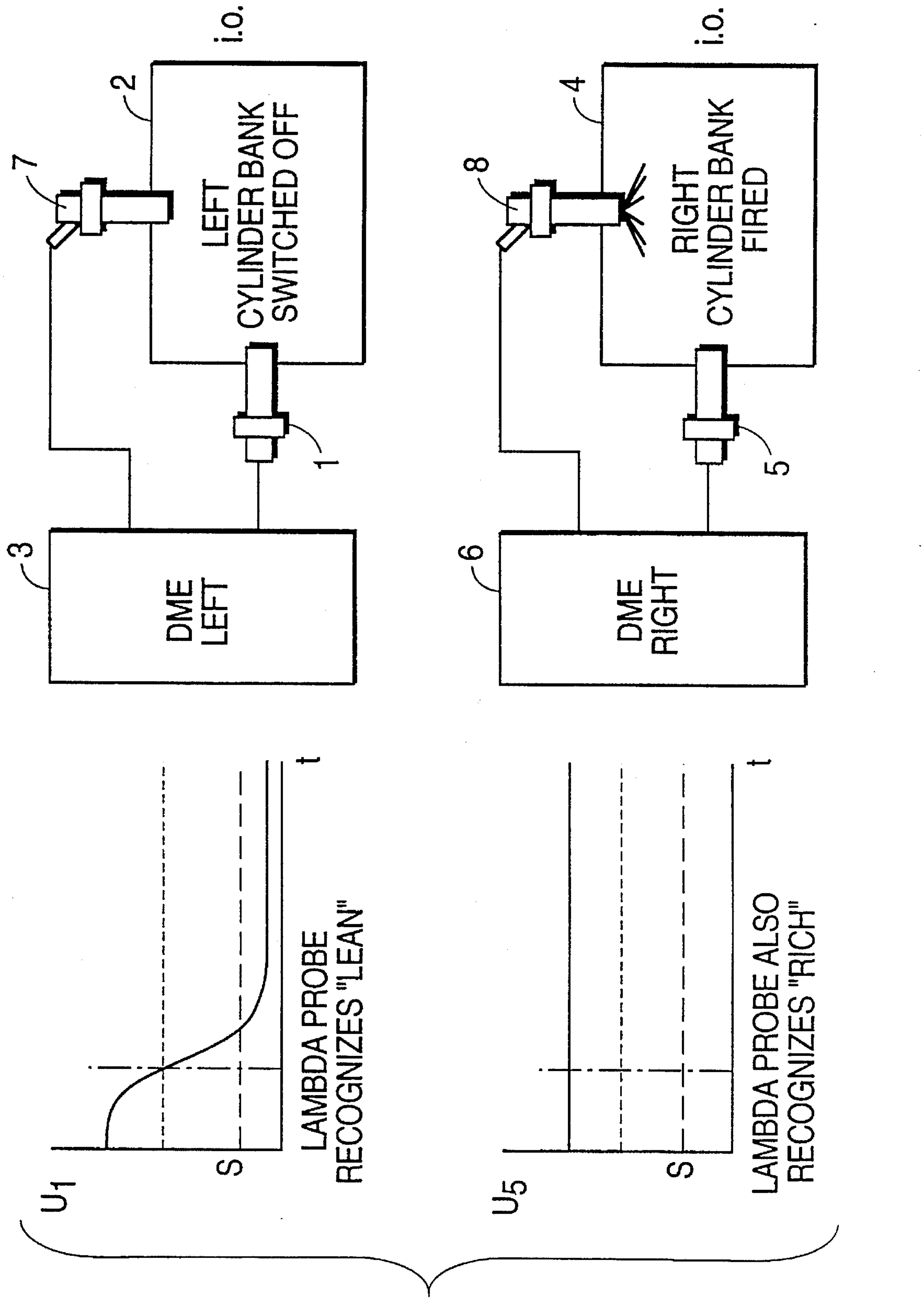
FIG. 1 is a view of the lambda probe signals of the lambda probes assigned to the left and right cylinder banks while the left cylinder bank is switched off.

The lambda probe signals $U_1$ and $U_5$ of the lambda probes 1 and 5 which are properly assigned to the left and the right cylinder bank 2 and 4, are illustrated on the left-hand side in FIG. 1. The two block diagrams on the right side of FIG. 1 show that lambda probe 1 provided for the left cylinder bank is correctly connected to the left internal-combustion engine control unit 3 provided for the left cylinder bank 2, and the lambda probe 5 provided for the right cylinder bank 4 is correctly connected to the internal-combustion engine control unit 6 provided for the right cylinder bank 4. The two internal-combustion engine control units 3 and 6 are constructed in the form of digital engine control units DME. In the block diagram illustrated in FIG. 1, the injection valves 7 of the left cylinder bank 2 are switched off, while the injection valves 8 of the right cylinder bank 4 are fired or activated. The two left diagrams of FIG. 1 show that lambda probe signal $U_1$ of the lambda probe 1 assigned to the switched-off cylinder bank 2, which is illustrated on the left top in FIG. 1, does not exceed the predetermined threshold value S at the end of the switch-off time of the injection valves 7. It therefore shows correctly that the left cylinder bank 2 is operated in a lean fashion. The connection of the lambda probes 1 and 5 is therefore correct.

Figure 2:
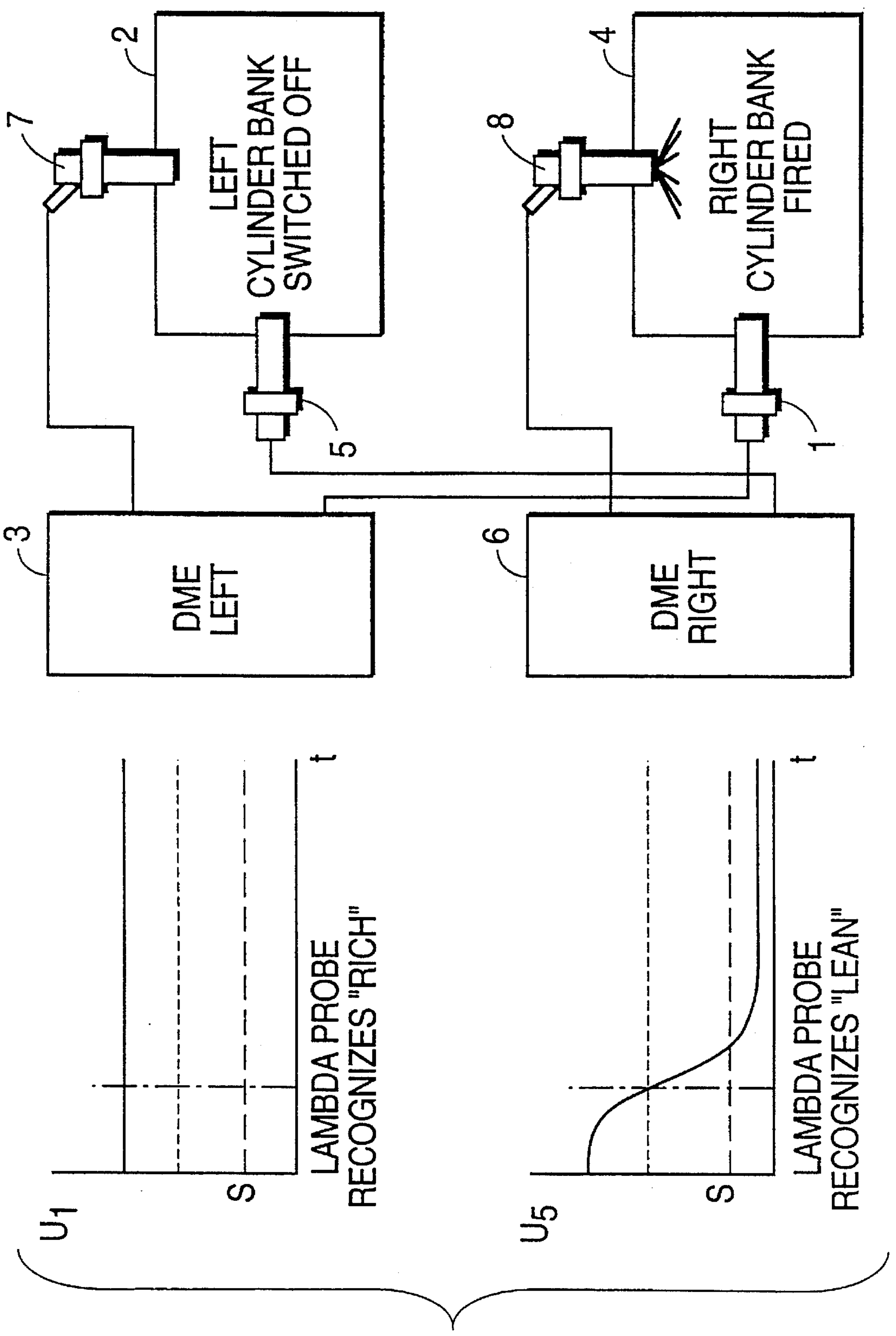
FIG. 2 is a view of the lambda probe signals of the two lambda probes provided for the left cylinder banks when the lambda probes are incorrectly installed in an interchanged manner.

In the block diagram shown on the right-hand side in FIG. 2, the individual elements are provided with the reference numbers used in FIG. 1. As illustrated in the block diagram of FIG. 2, the two lambda probes 1 and 5 are incorrectly installed to the two cylinder banks 2 and 4, being interchanged from left to right. The incorrect installation becomes clear when the two diagrams illustrated on the left-hand side of FIG. 2 are examined.

In FIG. 2, the lambda probe signal $U_1$ of lambda probe 1 is illustrated at the left top, which lambda probe 1 is actually assigned to the left cylinder bank 2, but is erroneously connected to the right cylinder bank 4. As shown in the diagram, when the left cylinder bank 2 is switched off (and therefore operated in a lean manner), the lambda probe signal $U_1$ of the lambda probe 1 indicates a rich mixture, while the lambda probe signal $U_5$ of the lambda probe 5 assigned to the right cylinder bank 4 (but connected to the left cylinder bank 2) indicates a lean mixture. FIG. 2 illustrates that the lambda probe signal $U_1$ of the lambda probe 1 assigned to the switched-off cylinder bank 2 but erroneously connected to the fired right cylinder bank 4 clearly exceeds the threshold value S at the end of the switch-off time of the injection valves 7, whereby the interchanged connection of the lambda probes 1 and 5 is recognized.

By means of this process according to the invention, the side-inverted, that is, crosswise-exchanged, connection of two so-called monitor probes can also be determined which are used for the monitoring of the respective catalyst conversion function.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for recognizing incorrect installation of lambda probes, said probes being interchanged from side to side, in an internal-combustion engine having two cylinder banks, each with an exhaust gas catalyst, a lambda probe and a lambda control unit connected thereto, said engine having injection valves which can be switched off at least by cylinder bank, said method comprising the steps of:

switching-off the injection valves of one of the two cylinder banks at least for a time which corresponds to a reaction or change-over time of the lambda probes;

comparing a lambda probe signal of a lambda probe assigned to a switched-off cylinder bank with a predetermined threshold valve, at the end of the switch-off time of the injection valves; and detecting an interchanged connection of the lambda probes when the lambda probe signal exceeds or falls below the threshold value.

2. Method according to claim 1, comprising the further steps of:

when an interchanged connection of the lambda probes is detected, the lambda controls are blocked and an error indicating device is activated.

3. Method according to claim 1, wherein an external testing device which can be connected to a diagnostic connection of the internal-combustion engine is used to detect an interchanged connection of the lambda probes.

4. Use of the method according to the invention according to claim 1, wherein in the internal-combustion engine control devices for an on-board diagnosis are provided.

* * * * *